(12) United States Patent
Jackson

(10) Patent No.: US 7,658,611 B2
(45) Date of Patent: Feb. 9, 2010

(54) INTERACTIVE PATIENT EDUCATION SYSTEM

(75) Inventor: Jeffery L. Jackson, Vancouver, WA (US)

(73) Assignee: Reality Engineering, Inc., Camas, WA (US)

( * ) Notice: Subject to any disclaimer, the term of this patent is extended or adjusted under 35 U.S.C. 154(b) by 501 days.

(21) Appl. No.: 11/082,233

(22) Filed: Mar. 15, 2005

(65) Prior Publication Data

US 2005/0233290 A1 Oct. 20, 2005

Related U.S. Application Data

(63) Continuation of application No. 60/554,630, filed on Mar. 18, 2004.

(51) Int. Cl.
*G09B 23/28* (2006.01)
(52) U.S. Cl. .................................... 434/262; 434/263
(58) Field of Classification Search .......... 434/262–263
See application file for complete search history.

(56) References Cited

U.S. PATENT DOCUMENTS

| | | | |
|---|---|---|---|
| 6,081,611 A * | 6/2000 | Linford et al. .............. 382/128 |
| 6,171,112 B1 * | 1/2001 | Clark et al. ................. 434/322 |
| 6,293,802 B1 * | 9/2001 | Ahlgren ...................... 434/252 |
| 6,845,485 B1 * | 1/2005 | Shastri et al. ............... 715/203 |
| 2002/0016967 A1 * | 2/2002 | Carlile ........................ 725/78 |
| 2003/0022141 A1 * | 1/2003 | Packard ...................... 434/262 |
| 2003/0216940 A1 * | 11/2003 | Sobel ........................... 705/2 |
| 2004/0007907 A1 * | 1/2004 | DiRe ....................... 297/217.3 |

OTHER PUBLICATIONS

Orasphere Product Brochure, 2005.
CAESY (Clinically Advanced Education System) interactive patient education, [online], [retrieved on Mar. 2, 2005] Retrieved from CAESY website using internet.
<URL:http://www.dentalhealthcenter.com/caesy.aspx>.

* cited by examiner

*Primary Examiner*—Cameron Saadat
(74) *Attorney, Agent, or Firm*—North Weber & Baugh LLP

(57) ABSTRACT

Interactive patient education system for use in operatory or office settings, provides interactive 3-D animations, graphics and other media, enabling real-time markup and customization to better illustrate and communicate not only generic information, but the individual patient's physiology, treatment options, and anticipated outcomes. Preferred embodiments are portable, computer-implemented, interactive multimedia educational tools. Import of patient-specific graphics, video and audio contributes to full-custom educational content to optimize patient understanding.

23 Claims, 12 Drawing Sheets

INTERACTIVE PATIENT EDUCATION SYSTEM

RELATED APPLICATIONS AND PRIORITY CLAIM

This application claims priority from U.S. Provisional Application No. 60/554,630 filed Mar. 18, 2004 and incorporated herein by this reference.

COPYRIGHT NOTICE

© 2004-2005 Reality Engineering, Inc. A portion of the disclosure of this patent document contains material that is subject to copyright protection, including without limitation the drawing figures submitted herewith. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This application pertains to interactive patient education for use in a medical or dental setting and, more specifically, relates to computer-implemented, interactive multimedia educational tools.

BACKGROUND OF THE INVENTION

Studies of patient education provided during diagnosis and treatment have demonstrated time savings and cost reductions as well as improvements in patient satisfaction, better health outcomes, better compliance, more empowered patient decision making, and reduced medical malpractice. In a healthcare environment where there is relentless pressure to reduce costs, the value of patient education as a cost savings tool is appreciated.

The market for patient education tools is very large. On average, Americans visit their doctor 3.5 times per year—totaling approximately 985 million patient encounters per year. 40 million people have surgery each year. Each of these encounters or procedures generates an opportunity for patient education.

Currently physicians and hospitals use a variety of methods for patient education. The primary tool for patient education is direct communication, i.e. talking between the provider and the patient. Often times the provider uses demonstrations, such as by using previously prepared or contemporaneously prepared images to supplement the discussion. Written materials, such as brochures, handouts, and other written material can also be provided to the patient. Audiovisual material, such as videos can sometimes be provided to the patient, or given to the patient to watch in their own homes, or in a waiting room or lobby.

Each of these methods has an associated cost in time or materials, and limitations. In present healthcare provider settings, providers often do not have enough time to fully explain diagnoses or procedures to patients. Materials that are previously prepared may not explain the particular details that make a particular patient's procedure different than one that is common or routine. Audiovisual materials, with nothing further, do not provide ability for the patient to ask questions.

One example of commercially available materials for dental practice are those offered by Orasphere. Orasphere provides a variety of still images and animations for use in dentistry, see www.orasphere.com. While these materials may include good quality images, the content is passive; it cannot be changed or adapted to a specific patient's needs or situation. FIGS. 13A and 13B show examples of content from a dental collection. These icons launch pre-recorded animations. Again, the content cannot be altered in real time.

Another example of the prior art is called the CAESY system, which is a collection of multimedia content delivered on DVD. A viewing system can be set up in a dental office operatory or reception area for patient use. The patient can select content to view as desired. The content is all pre-recorded and fixed in the DVD.

Embodiments of the invention address these and other limitations in the prior art.

SUMMARY

A computer driven, interactive, multi-media patient education system in accordance with the invention uses, creates and stores a variety of digital content such as photos, x-rays, movies and computer animations for selective presentation to a patient before, during or after consultation with a healthcare professional. During display of an animation, the patient or dentist, for example, can pause the animation. This action automatically makes a copy of a still image corresponding to the frame where the animation paused. In one embodiment, this copy can be revised or marked up for better communication with the patient.

In one embodiment, the still image is electronically marked up using a stylus in combination with a pen-enabled display screen and suitable software. In one embodiment, the screen is integral with a tablet or slate PC. Still images that are created by pausing the animation, along with their markups, are automatically saved as part of an electronic record of the session.

The electronic session record provides content for creating a custom report, which in turn can be forwarded, printed, emailed etc for reference. In one embodiment, the user creates the custom report, including selection of digital content, by means of a simple user-interface, preferably comprising a pen-enabled screen. The patient, as well, can virtually sign the record using a stylus.

In one embodiment, a "history panel" is displayed. Each time the current animation is paused, a still image is created by the software automatically and stored. Each such still image is represented by a corresponding icon or thumbnail in the history panel. These thumbnails can be selected (clicked, tapped, etc.) at any time to display the corresponding image. The history thumbnails also serve to "skip" to the corresponding frame in the animation from which they were created. The user can resume playing the animation from that spot using the play button. In this way, the history panel enables the user to skip around quickly between points of interest in the animation.

Additional aspects and advantages will be apparent from the following detailed description of preferred embodiments, which proceeds with reference to the accompanying drawings.

DETAILED DESCRIPTION OF THE PREFERRED EMBODIMENTS

Figure 1:
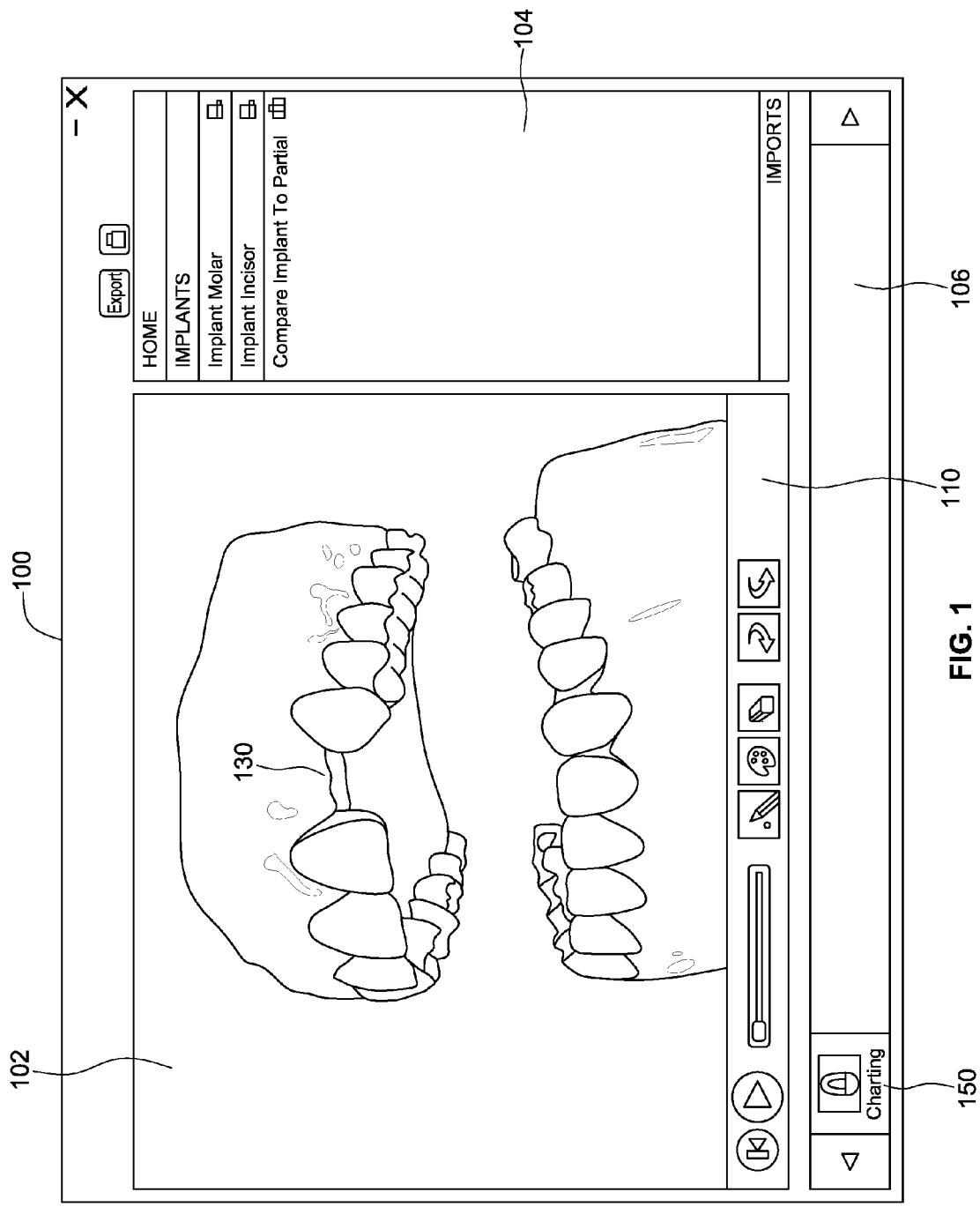
FIG. 1 shows a first view of a display screen 100 reflecting interactive operation in accordance with the present invention.

Embodiments of the invention include animated interactive models that can be manipulated to show organ structure, how body parts work together, how incisions or other invasive techniques will affect the involved structures, etc. Voice over and video can be added to the model if desired. These teaching models can be viewed on any modern computer display, such as a CRT, LCD, Plasma, etc. One advantage to particular embodiments of the invention is that the animation may be available on a portable computer and easily carried. Although it is possible to display such animations on Palm computers, having screens that are roughly 3"×5,", more dramatic results can be achieved from using larger computers, such as those on a "laptop" computer. Further, for portability and ease of use, tablet PCs, often called "slate style" computers are an excellent platform for displaying the animations.

One particular type of slate-style PCs that can be used with embodiments of the invention are the "Motion" line of Tablet PCs, from Motion Computing. Wacom® is a provider of pen sensor components to Microsoft IHVs (independent hardware vendors) for Tablet PC solutions. So-called "pen-enabled" products provide a simple, convenient and intuitive user interface for both the dentist and patient. In one embodiment of the present invention, interaction with the computer or display is done with a pen-like stylus.

Any acceptable display can be paired with a user interface that is extremely easy to use. The displays may be designed to be taken into the examining room or carried on hospital rounds. When such 3D animated procedures are coupled to the viewing device, a virtual tour of any organ or body part can be shown, as well as demonstrating the effect of surgery or other procedures.

A combination of anatomically precise three-dimensional models and interactivity provides a perfect avenue for physicians or other knowledgeable persons to educate patients about their illness, explain surgical procedures, and respond to specific patient concerns. These interactive 3D models of human anatomy can be installed on portable PC tablets or slates and used in the doctor's office.

Example embodiments of the invention combine one or more technologies to create a useful end product. An animation begins with a 3D model of the desired object to be animated. Organs, groups of organs, skin layers, muscles, bones, ligaments, arteries and veins, and any other material desired to be animated can be represented in a 3D model.

Artists can "mock up" the 3D design in well known computer programs, such as 3D studio Max, Maya, Alias, Pro-Engineer, AutoCad, Catia, or Solid Works, for example. 3D designs are typically a collection of polygon elements and may include a variety of "skins" to provide "texture" to the objects. Further, any supporting objects, such as instruments used in surgical procedures can be animated. Animated 3D models will explain surgical processes or anatomy functionality.

The 3D models may be optimized to reduce the number of polygons by using, for example, one or more reducing tools such as 3D Studio max, Cult 3D, Cycore technology, and Stl reducers. Reducing the number of polygons reduces the ultimate amount of storage necessary to store the 3D animations. Of course, the number of polygons need not be reduced at all, but reducing them will typically enhance the performance of the display and the interaction.

Once the number of polygons is settled, smart models can be created that can be controlled to rotate, zoom, and animate. Tools for creating such interactions include Cult 3D and custom java/Macromedia director programming.

Next, animations are created that can play back without interaction. Video may be shot on subjects that are appropriate. This video can aid in explaining information, such as medical information, to the patient. Relevant images and audio tracks can also be added to help convey information about the animation to the patient.

Other animations are created for an interactive environment. These animations can be controlled in real-time by a knowledge provider, such as a doctor, as further described below. The animations can be manipulated to demonstrate function and interaction between the different represented components. For example, the animations can be manipulated to show organ structure, how body parts work together and, how incisions or other invasive techniques will affect the involved structures.

Software running on a computer, which may be inside the display (as in a slate machine), displays content and allows the user to mark up images on the fly with a stylus, before, during, or after the animation is run. This "user interface" can be made to interact with any software that may be present on the video screen, such as active X and the technology driving the stylus. Macromedia products and Java scripting may be used. A preferred embodiment of a user interface is further described below.

In combination, this blend of advanced engineering design, Digital Mockup, 3D modeling, animation, multimedia and web module development allows for increased education, and importantly, improved understanding.

Animations may be designed specifically with the doctor-patient relationship in mind. One of the aims of uses for the invention is to increase patient understanding of conditions, leading to better treatment compliance and improved outcomes for both patients and healthcare professionals. Such a set of tools helps the patient understand complicated conditions and gives doctors a tool through which they can more easily explain medical concepts.

In some embodiments, animations can be pre-loaded on a server and available to be watched or run at their convenience. Access to such animations may be password protected. In other embodiments, a record of the animations may be created during the animation itself, including real-time audio input from the instructor and student. Then, this stored animation becomes a new animation that can be viewed in playback. Either or both of the animations may be made available to the student—one animation that is interactive, and another that simply plays back the first animation directed by the instructor.

In a presently preferred embodiment, an interactive patient education system for use in dental or medical applications is deployed in a tablet PC with a pen-enabled display screen. The tablet machine can be hand held by the doctor or patient while in use. Battery operation enables it to be un-tethered. Alternatively, the PC can be mounted on an repositionable support arm for hands-free use. In one embodiment, a second screen can be connected for one of the users to view.

In one embodiment, menu selection of content serves as a starting point in an interactive session. In the list below, there is one category called IMPLANTS, and in that category, there are three content selections: two animations and one image. One animation is called "Implant Incisor". In our illustrative interactive session, the dentist wants the patent to understand this treatment option. Viewing the screen together, they see an initial screen display image similar to that shown in FIG. 1.

Referring to FIG. 1, the screen display comprises a window 100 consisting of several frames. The window 100 includes, by way of illustration and not limitation, a content display window 102, a menu window 104, and a toolbar 110. In the menu window 104, the dentist selected the Implants topic, which resulted in display of a list of content available under that topic.

The following list illustrates one embodiment of content for an interactive dental patient education system. The left column shows the topic and the right column shows the medium:

| Media Content | | | |
|---|---|---|---|
| DRAW TOOLS | image | IMPLANTS | |
| Maxillary Anterior | image | Implant Molar | animation |
| Maxillary Left | image | Implant Incisor | animation |
| Maxillary Right | image | Compare Implant to Partial | image |
| Maxillary Occlusal | image | BLEACHING | |
| Mandibular Anterior | image | Trays | animation |
| Mandibular Left | image | Strips | animation |
| Mandibular Right | image | PERIODONTICS | |
| Mandibular Occlusal | image | Periodontitis Stages | animation |
| Full Mouth Front | image | Stage 1 Healthy Gums | image |
| Full Mouth Right | image | Stage 2 Gingivitis | image |
| Full Mouth Left | image | Stage 3 Mild Periodontitis | image |
| Charting View | image | Stage 4 Moderate Periodontitis | image |
| Front Minus Soft Tissue | image | Stage 5 Severe Periodontitis | image |
| HYGIENE | | Gingival Recession | animation |
| Proxy Brush | animation | Gingivitis | animation |
| Cavity Cross Section | animation | Crown Lengthening | animation |
| Decay Stages | animation | ENDODONTICS | |
| Flossing | animation | Root Canal | animation |
| Flossing Close-up | animation | HIGH TECH | |
| Floss Aid | animation | Digital X-Ray | animation |
| Brushing Close-up | animation | Air Abrasion | animation |
| Brushing | animation | Cerec | animation |
| Brush Upper | animation | DENTURES | |
| Brush Lower | animation | Partial | animation |

| Media Content (continued) | | | |
|---|---|---|---|
| Sealant | animation | Over Denture | animation |
| Fluoride Treatment | animation | Compare Implant to Partial | image |
| Gingival Recession | animation | TMJ | |
| Gingival Stimulation | animation | TMJ | animation |
| INTRACORONAL RESTORATION | | CHILDRENS DENTISTRY | |
| Class I | animation | Fluoride Treatment | animation |
| Class III | animation | Gingivitis | animation |
| Class IV | animation | Plaque Buildup | animation |
| Class V | animation | Sealant | animation |
| MOD Amalgam | animation | Digital X-Ray | animation |
| MOD Composite | animation | Impressions | animation |
| CROWNS | | Mouth Guard | animation |
| Crown Process | animation | Space Maintainer | animation |
| Reason for Crown (large cavity) | image | Baby Bottle Decay | animation |
| Reason for Crown (cracked) | image | Cavity Stages | animation |
| Reason for Crown (large filling) | image | Crowns | animation |
| Reason for Crown (stain) | image | Flossing | animation |
| Cracked Tooth | animation | Pulpectomy | animation |
| BRIDGES | | Teeth and Skull Development | animation |
| Bridges | animation | Brusher Bailey | animation |
| Bridge Flossing | animation | Seal the Deal Animation | animation |
| VENEERS | | | |
| Veneer Malformed Tooth | animation | | |
| Fracture | image | | |
| Proximal Decay | image | | |
| Severe Stain | image | | |

The above list is merely illustrative and it could vary, for example, depending upon the practitioner's areas of practice or specialization. The Implant Incisor animation (highlighted above) will be used to further describe the invention below.

Referring again to FIG. 1, the user (hereinafter, the "user" refers to either the dentist or the patient) then selects the Implant Incisor video. In a presently preferred embodiment, the display is "pen-enabled" and the selection is made by touching a stylus to the display screen. Other user input devices are known and can be used. Upon selection, the Implant Incisor video is loaded and begins display in the display panel or frame 102.

Figure 11:
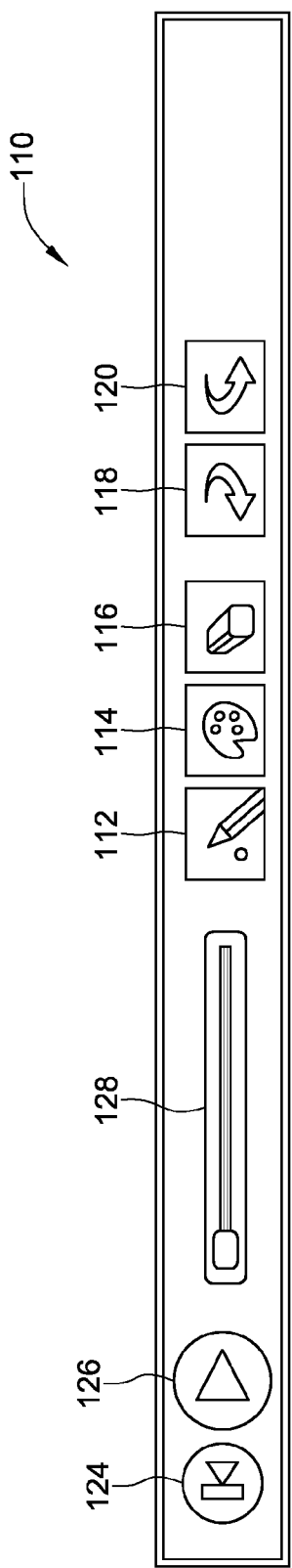
FIG. 11 is an enlarged view of the toolbar 110 of FIGS. 1-10.

The observant reader will see that an incisor tooth is missing at location 130 in the animation at the point shown in FIG. 1, i.e. at the beginning of the animation. FIG. 11 shows the toolbar 110 in greater detail. It includes buttons to rewind 124, and to play/stop 126 the animation at any time. A slider bar 128 shows progress of the animation (or video or audio when such are playing). Moving the slider bar allows the user to quickly move to any desired point in the presentation. Other toolbar buttons are discussed shortly.

Figure 2:
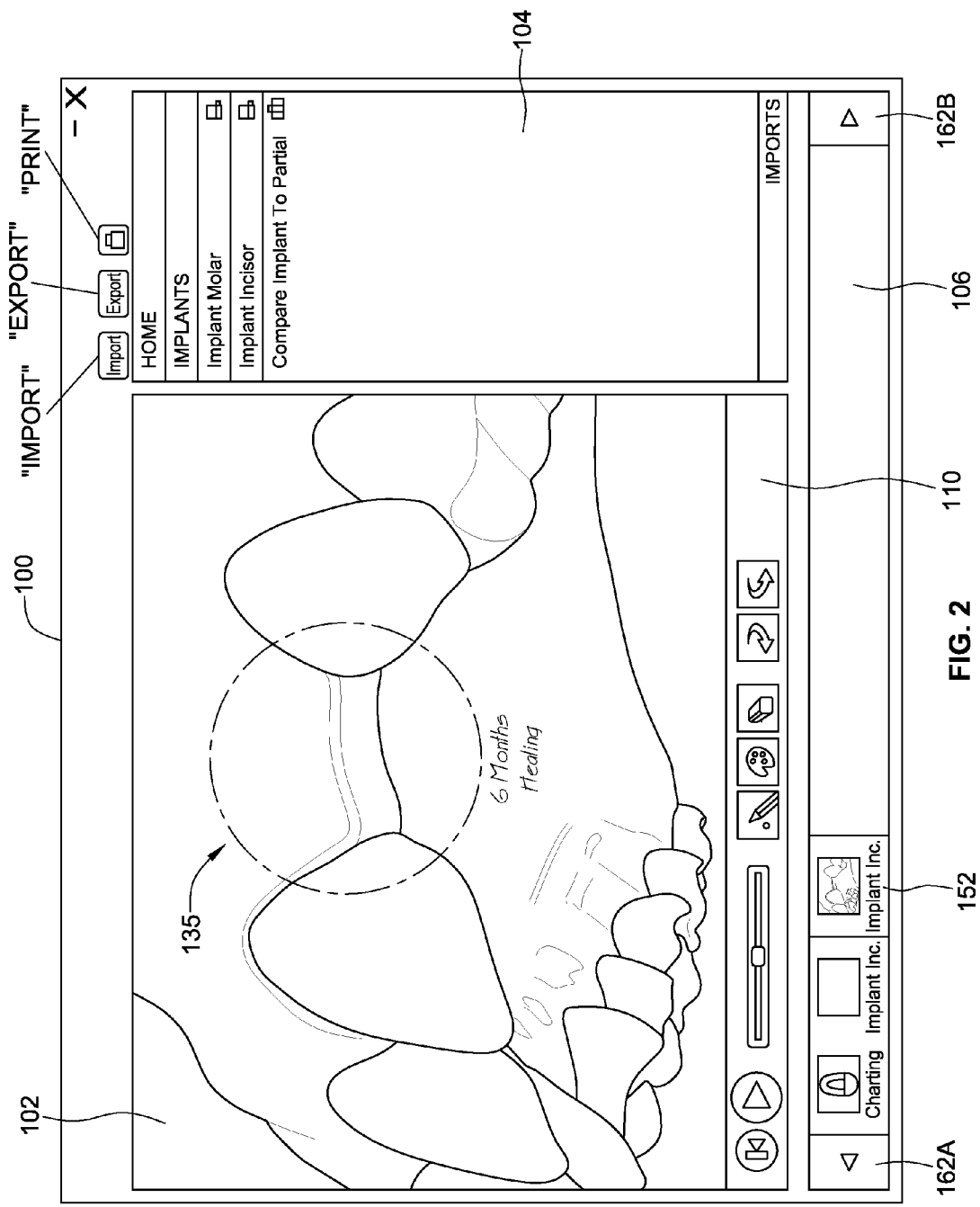
FIG. 2 shows a second view of display screen 100 reflecting interactive operation in accordance with the present invention.

Turning now to FIG. 2, the animation has progressed as indicated on the slider bar on toolbar 110. Here the user taps the play/stop button (126 in FIG. 11) to pause the animation. When the animation is stopped, the system immediately and automatically saves a still image corresponding to that point in the animation. That image is now displayed on the screen panel 102. Visual indicia show that the animation is paused, for example the play/pause button is changed to an alternate state, indicated for example by shadow or color. Also, other tools now available for use are likewise changed to alternate states. Referring again to FIG. 11, such tool buttons include a marker button 112, color palette 114, eraser 116, as well as fast forward and rewind arrows 118 and 120, respectively. The user can return to playing the animation at any time, simply by pressing the play/pause button once again.

Figure 12:
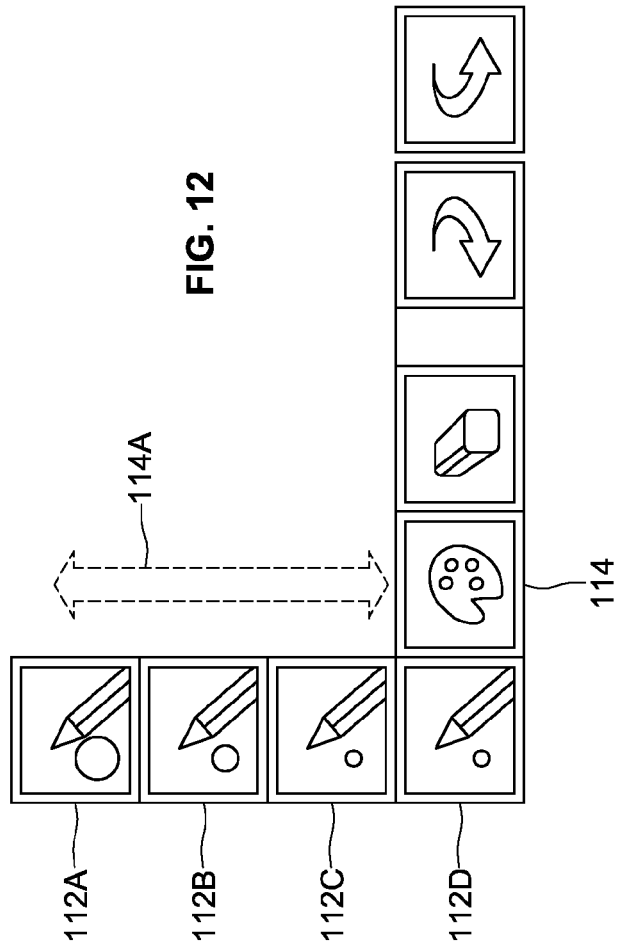
FIG. 12 illustrates pop-up expansion of toolbar buttons.
Figure 13A:
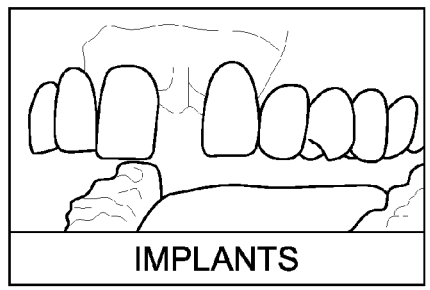
FIGS. 13A-13B illustrate prior art passive content.
Figure 13B:
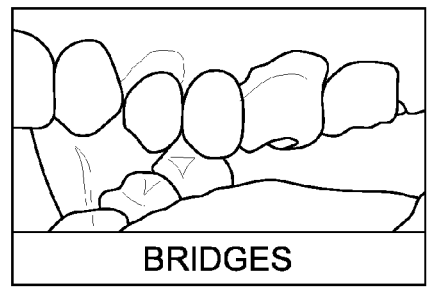

Returning to FIG. 2, while the animation is paused and the still image displayed, the user can mark up that image to facilitate discussion with and understanding by the patient. (Again, various user-input devices such as a mouse can be used, but we describe the pen-enabled preferred embodiment for illustration.) The dentist selects the marker tool by touching that button 112. Referring to FIG. 12, the button 112 preferably "expands" or pulls up a selection of marker tools, which can be of various sizes, shown as buttons 112A, 112B, 112C and 112D in descending order of relative size. Similarly, the user can select the palette button 114 which will bring up a selection of color buttons, indicated by 114A, for selection.

Having now selected a desired marker and marker color, we return to FIG. 2 where the dentist marks up the still image using the stylus. At 135, she circled the site of interest and wrote "6 months healing". Applying the stylus will cause corresponding markings to display on the image, consistent with the selected marker size and color. Errors can be removed by selecting the eraser button 116 and again applying the stylus in an intuitive manner. In the display panel 102 of FIG. 2, the dentist circled the site of interest, and wrote "6 months healing" to better explain the image.

Notice here the "history panel" 106 below the toolbar. Each time the current animation is paused, as noted above, a still image is created by the software automatically and stored. Each such still image is represented by a corresponding icon or thumbnail in the history panel 106. Here, the still image in 102 is represented by the thumbnail 152 in the history panel. These thumbnails can be selected (clicked, tapped, etc.) at any time to display the corresponding image in panel 102 for review or further discussion among the users. The history thumbnails also serve to "skip" to the corresponding frame in the animation from which they were created. The user can scroll through a larger number of thumbnails using arrows 162A-162B to march them along the history panel. The user can resume playing the animation from that spot using the play button. In this way, the history panel enables the user to skip around quickly between points of interest in the animation. A new image can be made at any time for further marking or study, again merely by pausing the presentation. Of course, an unwanted image can be deleted easily.

Figure 3:
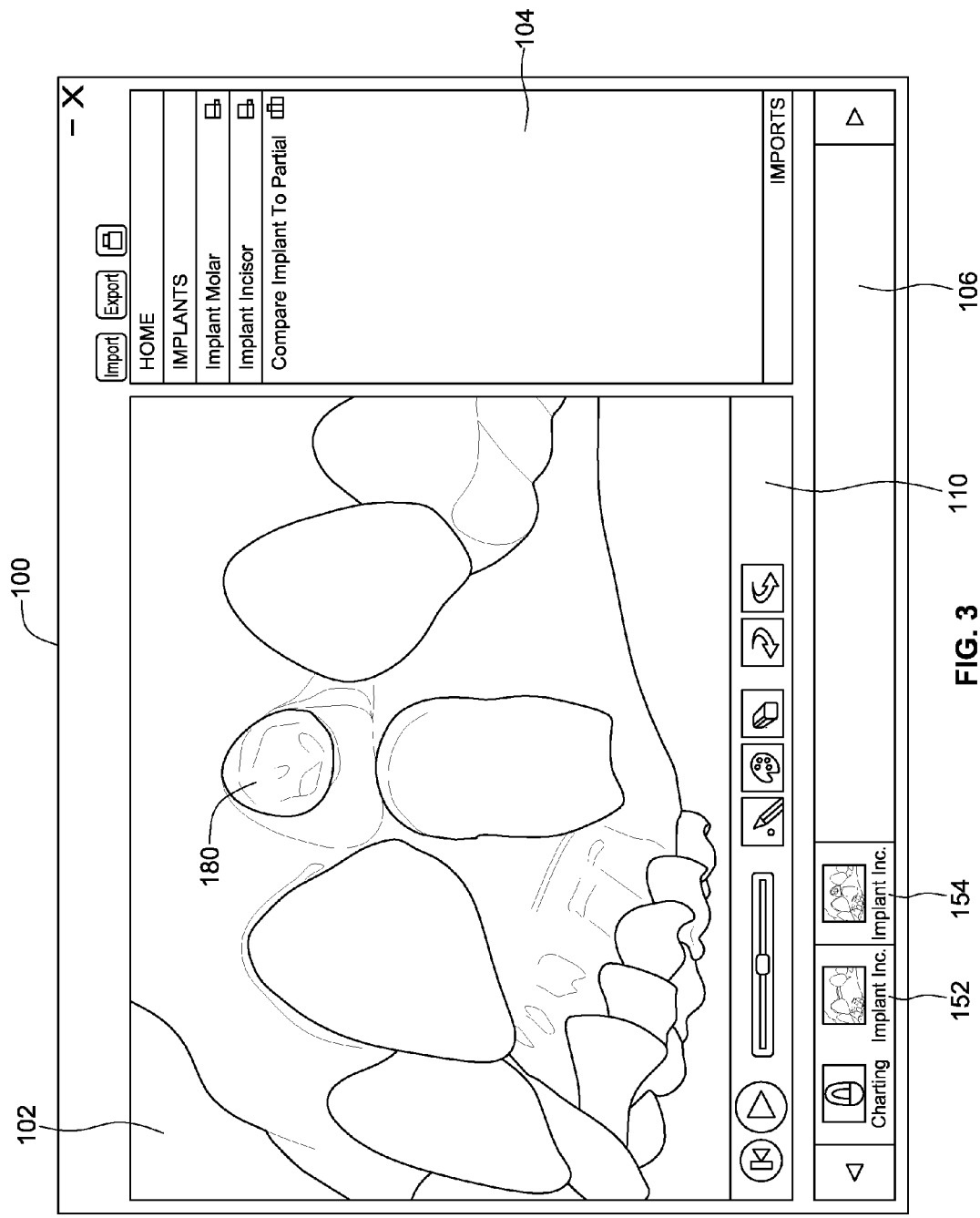
FIG. 3 shows a third view of display screen 100 reflecting interactive operation in accordance with the present invention.

Referring now to FIG. 3, the slider bar 128 indicates further progress of the animation, and again it is stopped as described above. Another still image is created automatically, corresponding to the place where the animation was paused, in other words, the corresponding "frame" of the animation is used to create a still image. That still image is displayed in panel 102 as before. In the history panel 106 below, we see the first still thumbnail 152 and the second (current) thumbnail 154. In still 154, the dentist once again can add markings if desired.

Figure 4:
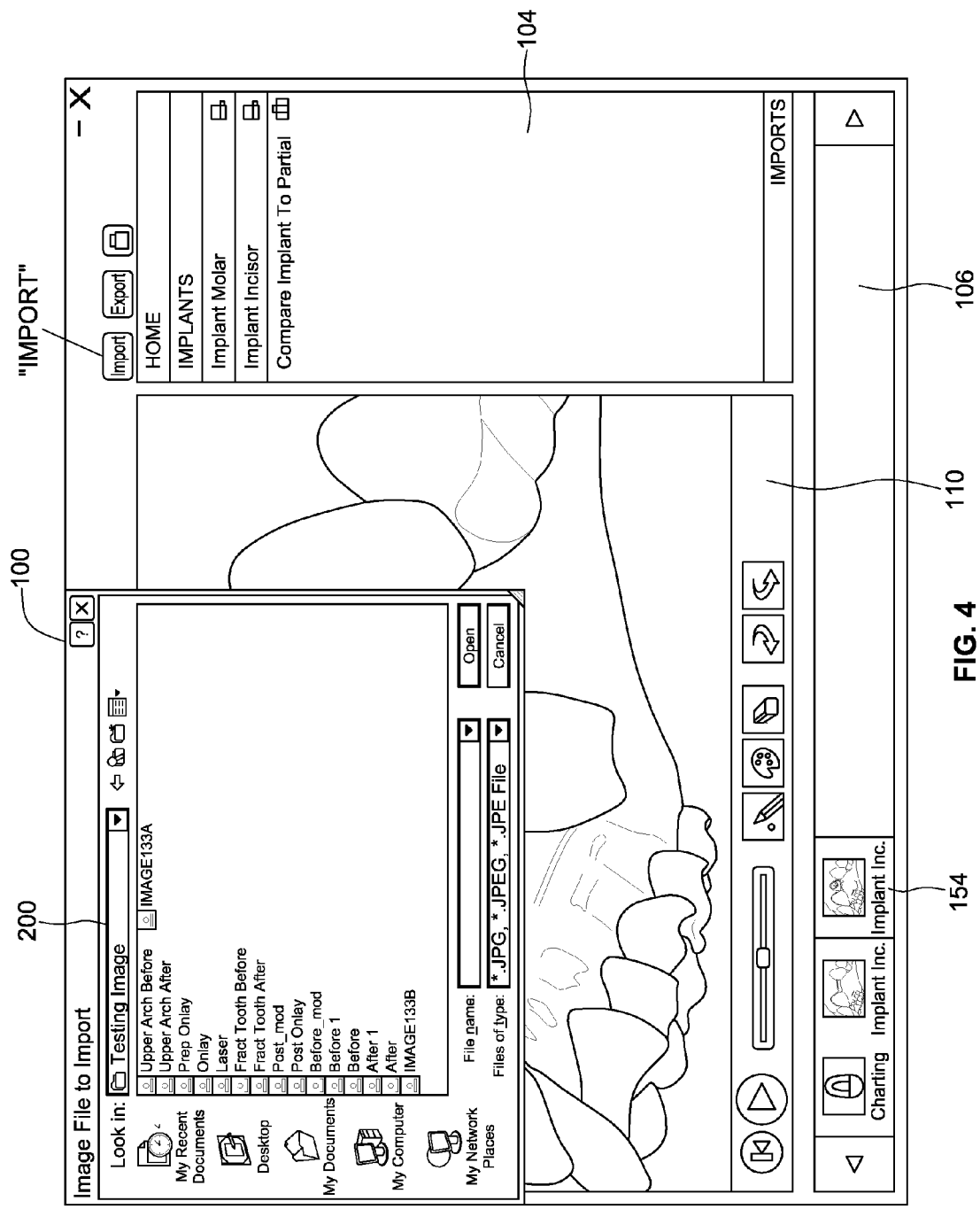
FIG. 4 shows a fourth view of display screen 100 reflecting interactive operation in accordance with the present invention.

Referring now to FIG. 4, the dentist next invokes an import function, by selecting the IMPORT button on the screen, which in turn displays an image import panel or browser 200. The import panel provides a browsing function to enable selection among existing files. These can be from any source, for example, they may be images of the present patient's dentition for comparison to the image 154. Standard digital image formats can be imported, for example gif, tiff, jpeg, bmp, png, targa.

Figure 5:
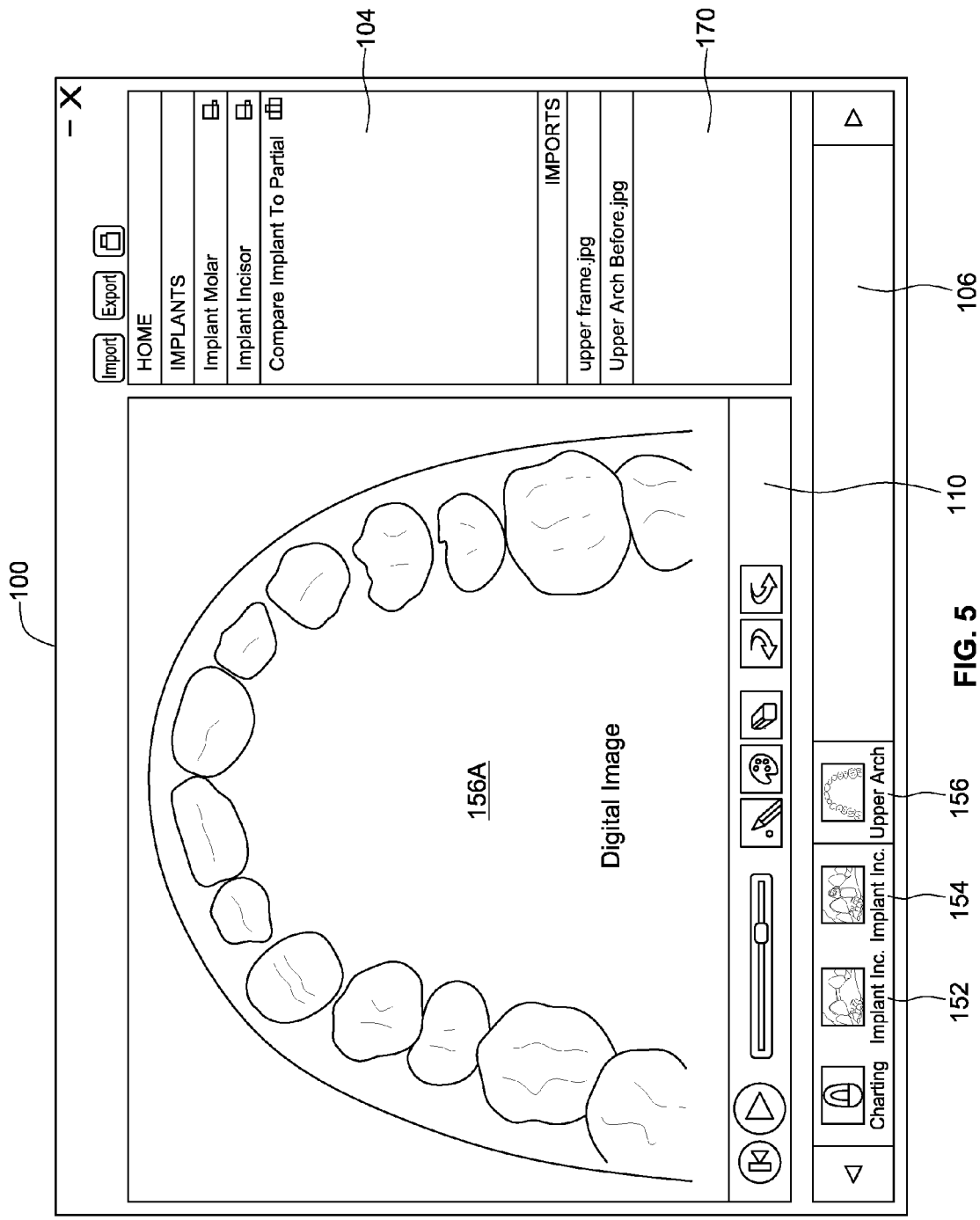
FIG. 5 shows a fifth view of display screen 100 reflecting interactive operation in accordance with the present invention.

Referring now the FIG. 5, it shows the result of importing a digital image for display, namely an x-ray 156A. Note that the history panel below now shows the still thumbnails 152, 154, and 156, the last one corresponding to the imported digital x-ray. These images shown in history panel 106 are forming a record of the present interactive session, complete with custom markings and other content. For example, an audio commentary by the user can be created and imported into the record. Details of digital audio recording are known and therefore omitted here.

Figure 6:
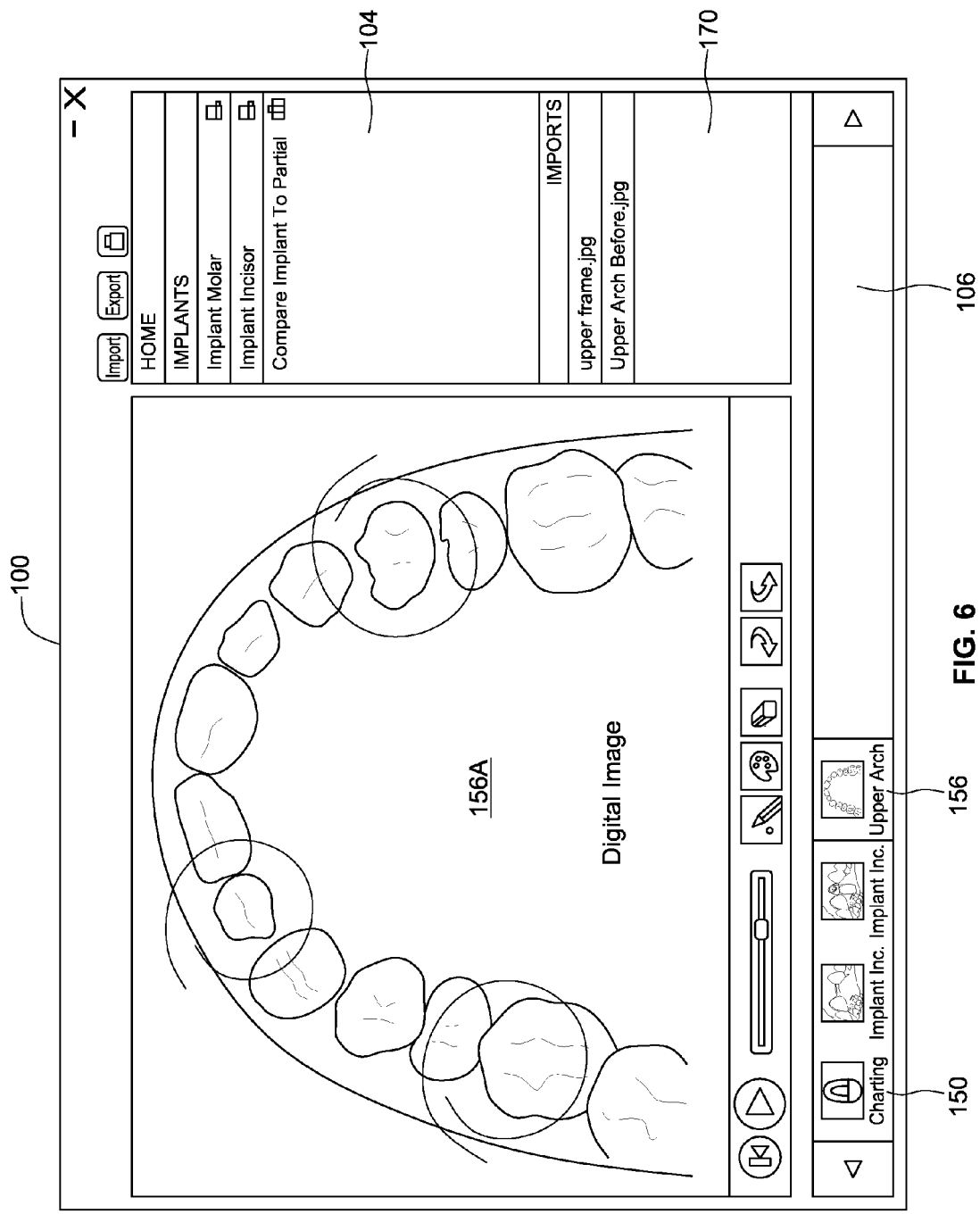
FIG. 6 shows a sixth view of display screen 100 reflecting interactive operation in accordance with the present invention.

Note also in FIG. 5 that a new display panel 170 ("Imports") is opened, where imported files are listed, in this case the Upper Arch Bottom.jpg as shown. This panel allows easy selection at any time among imported files. Referring now to FIG. 6, the dentist marks up the digital image 156A, circling points of interest on this image of the patient's upper teeth for discussion with the patient, using the marker tools as described above. The markups are stored automatically in, or in association with, the still image.

Figure 7:
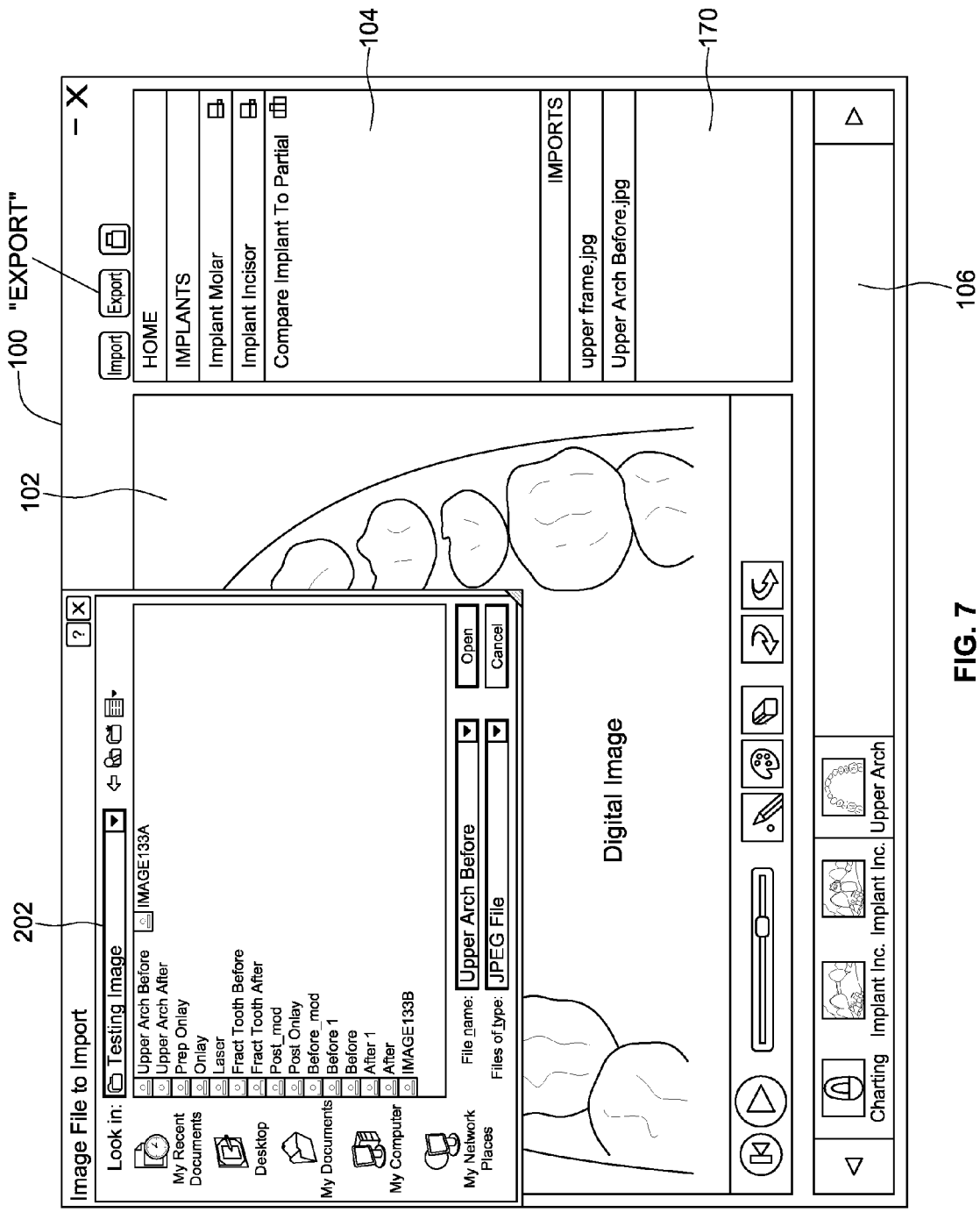
FIG. 7 shows a seventh view of display screen 100 reflecting interactive operation in accordance with the present invention.
Figure 8:
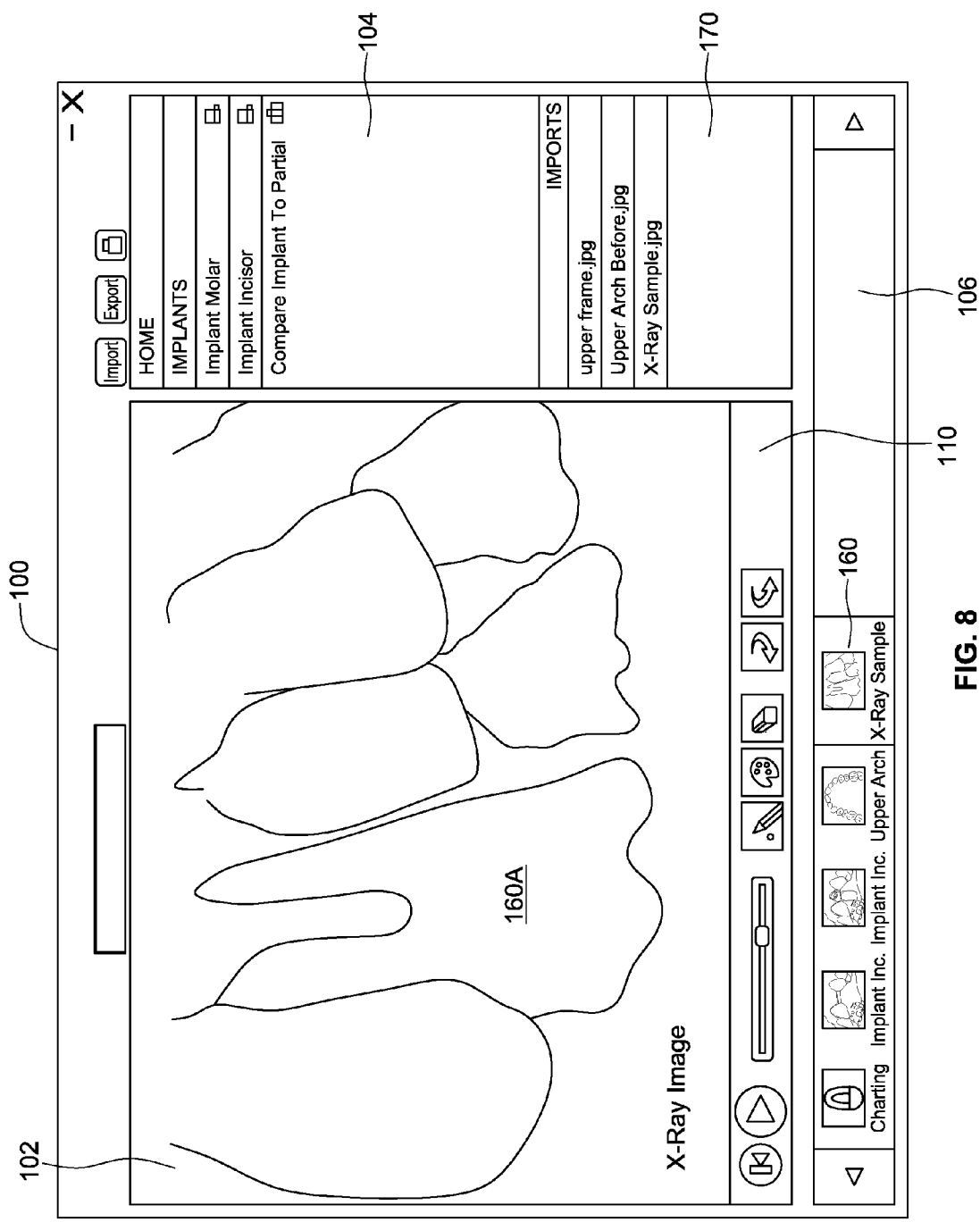
FIG. 8 shows an eighth view of display screen 100 reflecting interactive operation in accordance with the present invention.
Figure 9:
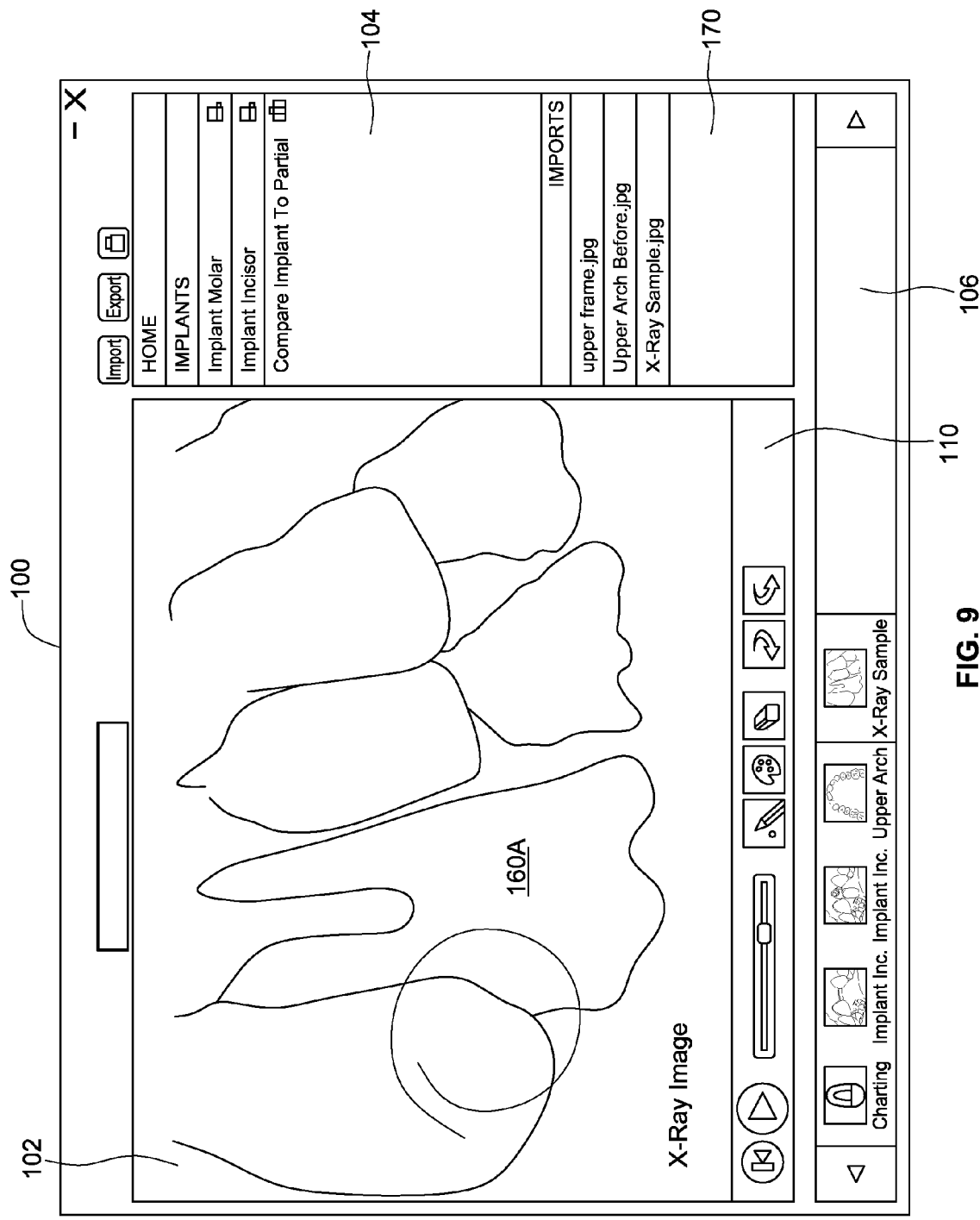
FIG. 9 shows a ninth view of display screen 100 reflecting interactive operation in accordance with the present invention.

Referring now to FIG. 7, in one embodiment, the dentist now invokes an EXPORT button to display a save image file browser 202, and here she selects the x-ray image file 160A. The x-ray image is saved and can be emailed. Any image can be saved, with or without markings. FIG. 9 shows how the dentist has marked up the x-ray 160A, using the same marker tools as described above.

Figure 10:
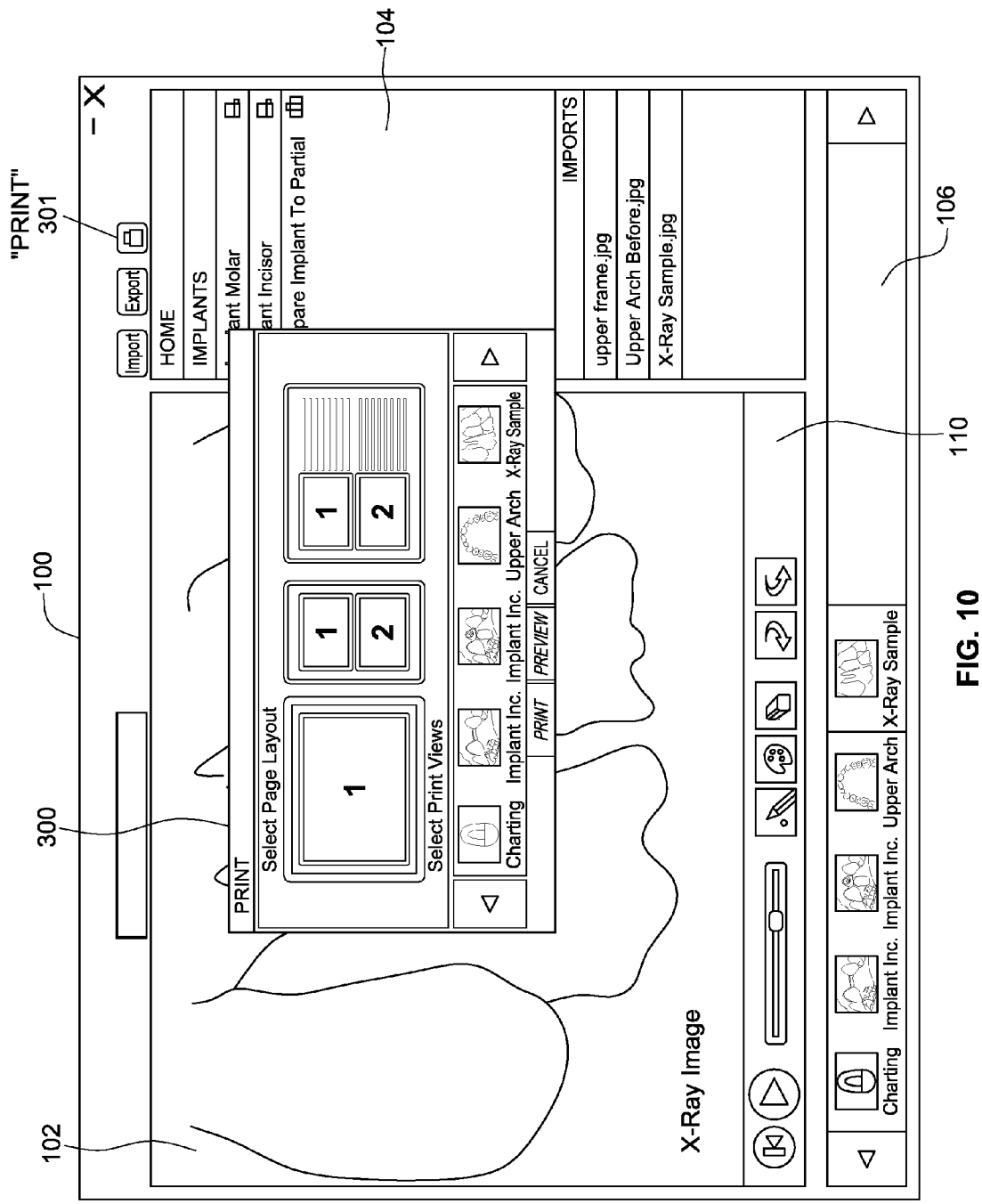
FIG. 10 shows a tenth view of display screen 100 reflecting interactive operation in accordance with the present invention.
Figure 14:
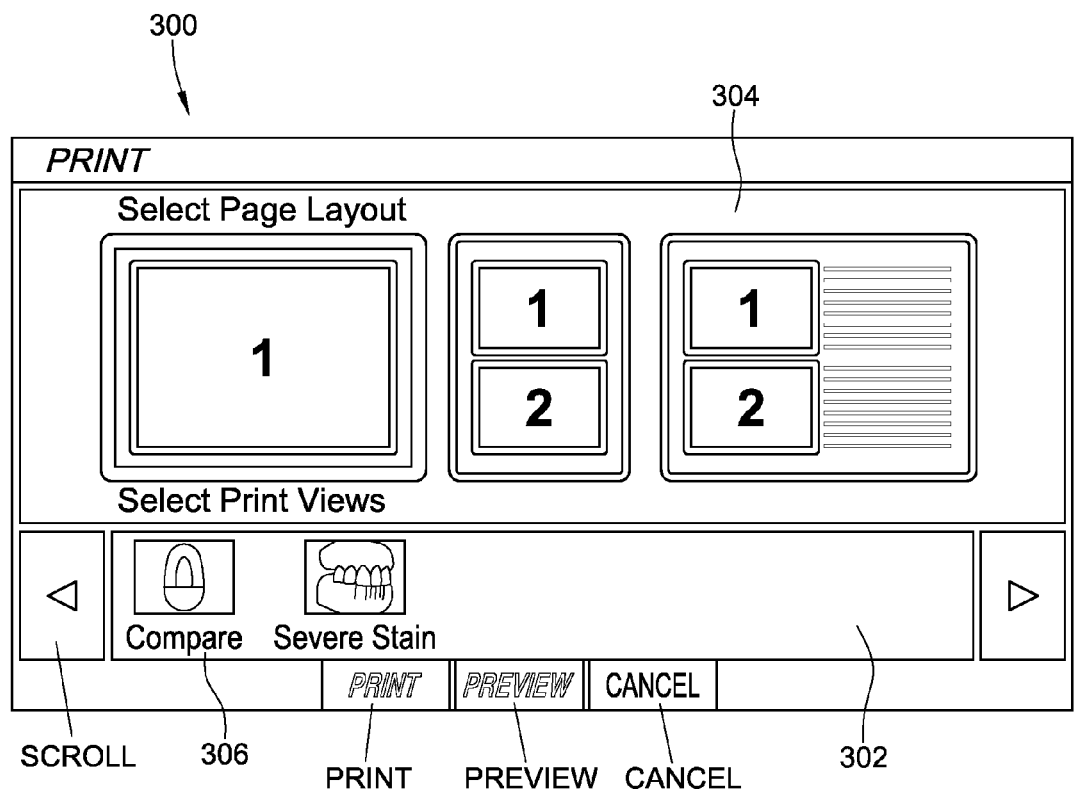
FIG. 14 shows detail of an output selection panel.

Referring now to FIG. 10, a print panel 300 is invoked to prepare a custom record or printout. This is invoked by a print button 301. FIG. 14 shows an enlargement of the print panel 300. It includes a selection panel 302 that mirrors the history panel 106, to provide for selection of any items from the history panel. The print panel also includes a "Select Page Layout" field 304 for selecting a desired layout for a report or record of the interactive session. Thumbnail 306 is an example of a comparison of bridges to implants can that be included in a report.

Alternatively, the dentist could assemble a report at any time, without the patient present, either in preparation for meeting with the patient, or after an office examination. The dentist can simply select various images and other content by touching the desired icons or thumbnails. She can also select a layout for the report. The finished report can be saved, emailed, printed, etc. for further reference. It may be useful for insurance billing documentation. For content, the dentist can select among various images, including standard or stock images, stock images marked up for the current patient, the patient's own images and or x-rays, in any combination. This powerful tool creates a record or printable presentation that is extremely effective for helping the patient understand the situation presented.

Applications and Advantages of the Invention

Patient education is a key component of patient-physician communication; however, the average patient asks only two questions during an entire medical visit lasting an average of 15 minutes. Patients who are actively involved in decision-making are more satisfied, have a better quality of life and have better health outcomes. A meta-analysis of 41 research studies showed that giving patients more information is associated with increased patient satisfaction, better compliance, better recall and understanding of medical conditions.

Physicians are the primary purveyors of medical information to patients. Given the documented value of patient education in improving outcomes, increasing patient satisfaction and avoiding malpractice, patient education should be a key tool for physicians and their staffs. Using embodiments of the invention can also reduce a number of malpractice claims, a significant portion of which extend from a lack of informed consent or failure to instruct the patient properly.

Surgeons demonstrate a much greater usage of patient education in their patient interactions than the typical physician. Almost one-half of patient-surgeon visits are dedicated to patient education and counseling by surgeons. Out of a average 13-minute visit, surgeons spent an average of 5.5 minutes educating and counseling the patient. Surgeons improve productivity with the introduction of time-saving patient education techniques.

Particular segments of the medical community may be prime candidates to benefit by using embodiments of the invention, such as Ob/GYN, surgery, such as orthopedic surgery, neurosurgery, pediatrics, neurology, oncology, and cardiology.

Hospitals are under pressure to reduce inpatient length of stay since the introduction of reimbursement based on diagnostically related groupings (DRG). Under the DRG system, used by Medicare, the hospital is paid an established fee based on the average length of stay associated with a diagnosis and/or procedure. By improving patient education, hospitals will benefit in producing better outcomes. In addition, nurses tend to spend a large portion of their time providing patient education. Interactive animated patient education on portable PC tablets, as well as other embodiments of the invention has a potential to meet hospital needs in several ways.

Embodiments of the invention combine 3D technology, audio, video, animation, logic/interface programming and the portability of a tablet PC. This combination of technology and portability allows the instructor to have personal interaction with the student (or patient) while interacting with three dimensional models of anatomy. The 3D anatomy models show with clarity procedures that are difficult to understand. Doctors can take snap shots of areas of interest as they spin the 3D models and zoom in on the area of the anatomy or procedure being discussed. The images that are created on the fly from the 3D interactive model, animation or video can then be marked up on the tablet using the stylus, as explained above, and then printed or emailed to the patient for reference.

A signature area can be included where the patient signs to verify they understand what has been explained to them. Patients may also have the ability to interact with the tablet unattended by a nurse or doctor. They can look up areas of interest and interact with the educational content. The patient is given a URL with a password so they can view over the Internet much of the content explained to them using the tablet PC.

In other embodiments of the invention, custom 3D representations can be made. For instance, using information available from a variety of resources, custom representations can be made of particular organs of the body, or objects based on other custom measurements.

In one method, the custom representations can be made from modifying existing, normalized versions of the particular object. Then, measurements of the particular object to be animated could be made. Such measurements could be made by scans, ultrasounds, magnetic imaging etc. The information obtained from these procedures is used to create a model from scratch, or a typical model may be modified. Measurements could be made of only a few important points, or from many points on the object to be imaged, depending on the level of customization desired.

The created model may be fully animated, allowing it to be viewed from any angle or distance. This unique ability will enable the patient and doctor to communicate like never before. This very clear 3D model will educate a patient about their condition including treatment options. These custom models will have the ability to be shared online, in print (via printer or email). The same process will update the 3D models as the patient undergoes a treatment regimen. The doctors can also use these simplified models to communicate with other physicians.

In other embodiments, a library of variety of similar objects can be stored. For example, a library of 10-200 or more different hearts animation images can be individually stored, each of which represents a particular problem or feature, such as size, or having clogged arteries. Instead of custom measuring the patient's particular heart, the closest model representing the patient's particular condition can be selected, and used to communicate, educate, and log the progress of the patient's medical condition. The model can also be utilized to demonstrate corrective procedures, giving a very comprehensive understanding of diagnosis, treatment and follow up protocol.

It will be obvious to those having skill in the art that many changes may be made to the details of the above-described embodiments without departing from the underlying principles of the invention. The scope of the present invention should, therefore, be determined only by the following claims.

The invention claimed is:

1. An interactive method for patient education comprising:
   presenting a pre-recorded animation directed to a topic of interest on a display screen;
   responsive to receiving a request to pause the animation at a selected frame of the animation, generating a still image that is a copy of the selected frame;
   presenting the still image that is a copy of the selected frame on the display screen; and
   responsive to receiving marking on the still image from an input device, saving the marking and the still image.

2. A method according to claim 1 wherein the topic comprises one of a dental diagnosis or a dental treatment.

3. A method according to claim 1 wherein the topic comprises one of a group of topics consisting of HYGIENE, INTRACORONAL RESTORATION, CROWNS, BRIDGES, VENEERS, IMPLANTS, BLEACHING, PERIODONTICS, ENDODONTICS, ADVANCED DENTAL TECHNOLOGIES, DENTURES, TMJ, and CHILDRENS DENTISTRY.

4. A method according to claim 3 wherein said selecting, pausing and marking steps are carried out using a user interface device.

5. A method according to claim 4 wherein the user interface device comprises a pen-enabled screen and a stylus.

6. A method according to claim 1 wherein the display screen is on a tablet PC device.

7. A method according to claim 6 wherein the tablet PC is pen-enabled.

8. A method according to claim 7 including automatically storing the marked still image in digital form.

9. A method according to claim 8 wherein said marking comprises freehand drawing on to the still image by applying a stylus over the pen-enabled PC.

10. A method according to claim 8 and further comprising associating a digital audio recording to the still image.

11. The method of claim 1 further comprising the step of:
    presenting on the display screen a history panel comprising a thumbnail image of the saved still image.

12. A machine-readable medium storing a set of program instructions to effect operation of a computer to carry out the following functions:
    creating a display on an electronic display screen;
    responsive to a user input, commencing display of a selected digital animation on the display screen;

responsive to a user input, pausing the animation at a selected frame of the animation;

responsive to said pausing step, automatically generating a still image that is a copy of the selected frame;

automatically presenting the still image on the display screen; and automatically storing the still image in memory.

13. A machine-readable medium according to claim 12 wherein the computer comprises a laptop computer.

14. A machine-readable medium according to claim 12 wherein the computer comprises a tablet computer.

15. A machine-readable medium according to claim 12 wherein the display screen is pen-enabled to provide said user inputs.

16. A machine-readable medium according to claim 12 wherein the program instructions further enable marking the still image on the display screen with an input device.

17. A machine-readable medium according to claim 16 wherein the computer comprises a pen-enabled display screen, the animation is displayed on the pen-enabled display screen, and said marking the image comprises free-hand marking using a stylus.

18. A machine-readable medium according to claim 12 wherein the program instructions further enable importing a digital image file and marking the imported image file.

19. A machine-readable medium according to claim 18 wherein the imported image file comprises a patient x-ray image.

20. A machine-readable medium according to claim 18 wherein the computer comprises a pen-enabled display screen, the animation is displayed on the pen-enabled display screen, and said marking the image comprises free-hand marking using a stylus.

21. An interactive system for patient education in a face-to-face setting comprising:

a computer for creating, modifying and storing digital content files;

an electronic display screen coupled to the computer for display of information under control of the computer;

a user input system coupled to the computer for user interaction with the computer;

software executable on the computer to enable a user, via the user input system, to select and play a pre-recorded digital animation on the display screen;

the software enabling the user, via the user input system, to pause the animation;

the software automatically controlling the computer to create and store a still image, in response to the user pausing the animation, the still image being a copy of a frame at which the user paused the animation; and the software enabling the user, via the user input system, to mark up the stored still image.

22. An interactive system for patient education according to claim 21 wherein the electronic display screen is pen-enabled and the user input system includes a stylus for use with the pen-enabled screen.

23. An interactive system for patient education according to claim 21 wherein the software automatically presents on the display screen a dynamic history panel comprising thumbnail images of the stored still images.

* * * * *